United States Patent
Gong

(10) Patent No.: US 11,987,321 B2
(45) Date of Patent: May 21, 2024

(54) ELECTRICALLY-ASSISTED PEDAL CYCLES

(71) Applicant: EBIKE SYSTMS LTD, London (GB)

(72) Inventor: Linan Gong, London (GB)

(73) Assignee: EBIKE SYSTEMS LTD, London (GB)

( * ) Notice: Subject to any disclaimer, the term of this patent is extended or adjusted under 35 U.S.C. 154(b) by 361 days.

(21) Appl. No.: 17/615,993

(22) PCT Filed: Jun. 4, 2020

(86) PCT No.: PCT/GB2020/051353
§ 371 (c)(1),
(2) Date: Dec. 2, 2021

(87) PCT Pub. No.: WO2020/245591
PCT Pub. Date: Dec. 10, 2020

(65) Prior Publication Data
US 2022/0315164 A1    Oct. 6, 2022

(30) Foreign Application Priority Data
Jun. 5, 2019  (GB) .................................. 1908042

(51) Int. Cl.
*B62M 6/65*  (2010.01)
*B62M 11/16*  (2006.01)
*B62M 11/18*  (2006.01)

(52) U.S. Cl.
CPC .............. *B62M 6/65* (2013.01); *B62M 11/16* (2013.01); *B62M 11/18* (2013.01)

(58) Field of Classification Search
CPC .......... B62M 6/65; B62M 11/16; B62M 11/18
See application file for complete search history.

(56) References Cited

U.S. PATENT DOCUMENTS 3,934,493 A  *  1/1976  Hillyer .................. B62M 11/16
                                                475/297
8,226,517 B2 *  7/2012  Tsai ...................... B62M 11/16
                                                475/329
(Continued)

FOREIGN PATENT DOCUMENTS

| EP | 0657347 | B1 * | 7/1994 | |
| EP | 1642820 | A1 * | 4/2006 | ............ B62M 11/16 |
| EP | 2218635 | A1 * | 8/2010 | .............. B60L 50/20 |
| EP | 2218635 | A1 | 8/2010 | |

(Continued)

OTHER PUBLICATIONS

GB Search Report dated Jun. 20, 2019 for Application No. GB190804.3.

(Continued)

*Primary Examiner* — Jacob B Meyer
(74) *Attorney, Agent, or Firm* — Christopher M. Ramsey; GrayRobinson, P.A.

(57) ABSTRACT

A drive system for a cycle has an input that receives drive from a pedal. An output rotates to drive a wheel via an electrical machine that provides motor drive. A drive train transmits drive to the output. The drive train includes first and second epicyclic gear sets EP-1, EP-2, which each include a sun gear, a planet carrier, a plurality of planet gears, and an annulus gear. Both annulus gears are connected to the output. Both sun gears are driven by the electrical machine. The first epicyclic gear set transmits drive from its sun gear to its annulus gear with its planet carrier in a fixed position. The second epicyclic gear set transmits drive from a pedal to its annulus gear via its planet carrier. Electrical assistance may be provided when the cyclist is pedalling and not pedalling.

17 Claims, 3 Drawing Sheets

(56) References Cited

U.S. PATENT DOCUMENTS

| | | | | |
|---|---|---|---|---|
| 8,550,199 | B2 * | 10/2013 | Moeller | B62M 6/45 |
| | | | | 180/206.7 |
| 8,636,095 | B2 * | 1/2014 | Ito | B60L 15/2009 |
| | | | | 180/206.6 |
| 9,802,673 | B2 * | 10/2017 | Hayslett | B62M 11/145 |
| 2001/0008859 | A1 * | 7/2001 | Masaki | B62M 6/55 |
| | | | | 475/221 |
| 2011/0034283 | A1 * | 2/2011 | Tsai | B62M 11/16 |
| | | | | 475/269 |
| 2012/0012412 | A1 * | 1/2012 | Moeller | B62M 6/65 |
| | | | | 180/206.2 |
| 2012/0305325 | A1 * | 12/2012 | Ito | B62M 11/16 |
| | | | | 180/206.6 |
| 2016/0339993 | A1 * | 11/2016 | Hayslett | B62M 11/145 |
| 2022/0315164 | A1 * | 10/2022 | Gong | B62M 11/18 |

FOREIGN PATENT DOCUMENTS

| | | | |
|---|---|---|---|
| EP | 3059155 A1 | 8/2016 | |
| FR | 2671045 A1 * | 7/1992 | ............ B62M 11/18 |
| GB | 2580446 A * | 7/2020 | ............ B62M 11/16 |
| NO | 20210586 A1 * | 5/2021 | |
| WO | WO-2018096521 A2 * | 5/2018 | ............ B62J 45/411 |
| WO | 2018113998 A1 | 6/2018 | |
| WO | WO-2019206835 A1 * | 10/2019 | ............ B62K 19/30 |
| WO | WO-2019206836 A1 * | 10/2019 | ............ B62K 19/30 |
| WO | WO-2023170394 A1 * | 9/2023 | ............ B62M 6/55 |

OTHER PUBLICATIONS

International Search Report dated Sep. 23, 2020 for PCT/GB2020/051353.

* cited by examiner

Two epicyclic gear sets, one duplex crank speed sensor control, no torque sensor
Carrier EP1 is on the electrical boosting side, Carrier EP2 is on the human input side, connected to the sprocket 80 and chain 70
$i0EP1 = 5, i0EP2 = 8$
Clutch Status: 1 = closed or engaged, 0 = open or disengaged

| time unit | crank 50 speed | carrier 13 speed EP1 | rider torque | carrier 23 speed EP2 | between carrier 13 and ground (axle 1) clutch V | between carrier 23 and hub member 100 clutch K | between carrier 23 and sprocket 60 freewheel | motor speed (m) | Motor current | bike speed | status of transmission | Outer hub 100 speed (n) |
|---|---|---|---|---|---|---|---|---|---|---|---|---|
| 1 | 0 | 0 | 0 | 0 | 1 or 0 | 1 or 0 | 1 or 0 | 0 | 0 | 0 | idle | 0 |
| 2 | >0 | 0 | >0 | 0 | 1 or 0 | 1 or 0 | 1 or 0 | 0 | 0 | >0 | launching | >0 |
| 3 | >0 | 0 | >0 | >0 | 1 | 0 | 1 | $m>0$, $m>=n/5$ | >0 | >0 | boosting, torque and power addition via EP1 | $n[ps] = n/5$, it is > $m/5$ which is the mechanical annulus speed of EP2, thus it overruns carrier 23 |
| 4 | >0 | 0 | >0 | >0 | 0 | 0 | 1 | $m>=n/5$ | >0 | >>0 | accelerating, power addition via EP2 | CVT functioning, hub overruns boosting clutch as a result of power combining |
| 5 | >0 | 0 | >0 | >0 | 0 | 0 | 1 | $m=f(n,0,iEp2)$ | >0 | >>0 | cruising, power addition via EP2 | hub member overruns both clutches |
| 6 | >0 | 0 | >0 | 0 | 0 | 0 | 0 | 0 | 0 | >>0 | coasting | all branches open, hub speed positive |
| 7 | >0 | 0 | >>0 | >0 | 1 | 0 | 1 | $m>0$, $m>=n/5$ | >>0 | >0 | climbing | running up a hill, hub member speed declining |

TABLE 1

FIG. 7

ELECTRICALLY-ASSISTED PEDAL CYCLES

CROSS-REFERENCE TO RELATED APPLICATIONS

This is the U.S. National Stage application of International Application No. PCT/GB2020/051353, filed Jun. 4, 2020, which claims the benefit of priority from GB Application No. 1908042.3, filed Jun. 5, 2019. The entire contents of these prior applications are incorporated by reference herein.

FIELD

This relates to electrically-assisted pedal cycles.

BACKGROUND

There are various forms of pedal cycle. One conventional form of pedal cycle is that which is only ever driven by a cyclist applying force to the pedals, such cycles sometimes being referred to as "push bikes". Another more recent form of pedal cycle is the electrically-assisted pedal cycle, commonly now known as "e-Bikes", in which electrical power is used to assist or replace the efforts of the rider. Both conventional pedal cycles and e-Bikes may have two, three or four wheels, and, in some, cases even more. In the present document, the term "pedal cycle" is used to include both conventional pedal cycles and e-Bikes.

As mentioned, in an e-Bike, electrical power is used to assist, or in some cases replace, the efforts of the rider. Accordingly, e-Bikes include means for storing electrical energy, such as batteries, and an electric motor arranged to propel, either in combination with pedal input, or to replace pedal input. The batteries can be recharged by plugging them into a supply of electrical energy, such as an outlet from a mains supply; in some cases, also by recovering energy from motion of the cycle by way of regenerative braking, and in others by generation of electricity in a series hybrid configuration. The principle of regenerative braking will be familiar to those skilled in this field of technology.

As a result, the overall effort usually required by a cyclist to pedal an e-Bike is lower than for a conventional cycle, or absent. e-Bikes can be placed into one of two groups.

The first group is that in which the cycle can provide electrical assistance on demand, at any time, regardless of whether or not the cyclist is pedalling. Cycles in this group can be thought of as being generally equivalent to electric mopeds. The pedal input may be rarely used or only as a "limp home" capability when the battery is discharged. Cycles in the second group only provide electrical assistance when the cyclist is pedalling. These are referred to as "pedelecs".

Currently, in all European Union countries, including the UK, and many other countries, pedelecs are effectively legally classified as conventional bicycles and so may be ridden without a driving license or insurance, providing electrical assistance ceases at a speed of 25 kph (although a separate category of "speed pedelecs" with a speed limitation of 45 kph has license and insurance requirements). There are therefore few barriers to owning and operating a pedelec.

In recent years, technical advances have been made to the electro-mechanical drive arrangements and to the associated energy storage and recovery devices used in e-Bikes. These advances have resulted in e-Bikes that can be operated with greater efficiency, and hence greater ease, by the cyclist.

For all the reasons given above, e-Bikes are becoming increasing popular, all over the world.

By way of background, the reader is referred to our PCT publications WO2010/092345, WO2017/021715 and WO2018/020259, where much information about e-Bikes is provided. There is particular reference to the use of continuously variable transmissions (CVTs) in pedelecs.

BRIEF SUMMARY

The use of CVTs in pedelecs is recent and is characterized by significant ease-of-use advantages. Nonetheless, given the earlier adoption of direct drive systems in pedelecs, the riding feeling of a CVT requires to be adapted to make it behave and feel similar to a direct drive, which has become the norm. This involves modifying the mechanical configuration of the CVT to provide additional boost capability at launch and in high torque requirement situations. The question then arises as to how that extra electrical assistance is switched in and out in a controlled and smooth manner.

Preferred embodiments of the present invention aim to provide pedelecs and drive systems for them, in which an electrical power boost may be provided in a predictable and repeatable manner, in order to afford a ride that feels as natural as possible to a rider. Embodiments of the invention may be particularly effective in the use of a 3-branch power combining epicyclic transmission (two inputs and one output) in a CVT transmission.

Whilst preferred embodiments of the invention concern pedelecs in which electrical assistance is provided only when the cyclist is pedalling, electrical assistance may optionally be provided also when the cyclist is not pedalling.

According to one aspect of the present invention, there is provided a drive system for an electrically-assisted pedal cycle, the system comprising:
  an input that, in use, receives drive from a pedal of the cycle and rotates about an axis;
  an output that, in use, rotates about said axis to provide drive to a driven wheel of the cycle;
  an electrical machine that, in use, provides motor drive to said output; and
  a drive train that, in use, receives drive from the electrical machine and the pedal and transmits drive to said output;
wherein:
  the drive train comprises a first epicyclic gear set and a second epicyclic gear set:
  each of the epicyclic gear sets comprises a sun gear, a planet carrier, a plurality of planet gears and an annulus gear, the planet gears being mounted on the planet carrier and meshing with both the sun gear and the annulus gear, and the annulus gear being connected to said output to rotate, in use, with said output:
  both of the sun gears are connected to be driven by the electrical machine:
  the first epicyclic gear set, in use, transmits drive from its sun to its annulus with its planet carrier in a fixed position: and
  the second epicyclic gear set, in use, transmits drive from a pedal to its annulus via its planet carrier.

Preferably, the drive system further comprises a one-way clutch between the planet carrier and annulus of the second epicyclic gear set, to prevent the planet carrier from rotating faster than the annulus of the second epicyclic gear set.

Preferably, a free-wheel mechanism is operative between the pedals and driven wheel of the cycle.

Preferably, the electrical machine is configured to operate selectively as a generator or a motor and the system further comprises a controller that alternately operates the electrical machine as a generator for a first period and then as a motor for a second period, the controller obtaining an indication of torque applied at the inner hub as a function of generator output, and then applying power to the motor as a function of the torque indicated.

A drive system as above may be located at a mid-position of the cycle, wherein said axis is an axis of rotation of the pedals.

A drive system as above may be located at a hub of a driven wheel of the cycle, wherein said axis is an axis of an axle about which the driven wheel rotates.

Said driven wheel may be a rear wheel of the cycle.

The sun gear of the first epicyclic gear set and the sun gear of the second epicyclic gear set may be provided as a common sun gear.

The sun gear of the first epicyclic gear set and the sun gear of the second epicyclic gear set may be separate gears, one of which is connected to receive said motor drive via a one-way-bearing, to facilitate pushing of the cycle backwards.

Preferably, the first and second epicyclic gear sets have different transmission ratios.

The first and second epicyclic gear sets may be disposed at opposite sides of the electrical machine.

The first and second epicyclic gear sets may be disposed at the same side of the electrical machine.

The invention extends to an electrically-assisted pedal cycle having a drive system according to any of the preceding aspects of the invention.

Such an electrically-assisted pedal cycle is preferably a pedelec in which electrical assistance is provided only when the cyclist is pedalling.

Optionally, electrical assistance is available both when the cyclist is pedalling and also when the cyclist is not pedalling.

There may be provided a throttle control by which a cyclist can apply or superimpose a desired amount of electrical assistance.

In a further aspect, the invention provides a method of operating such an electrically-assisted pedal cycle, comprising the steps of providing motor drive to the driven wheel of the cycle by said electrical machine and via said first epicyclic gear set, and providing pedal drive to the driven wheel of the cycle via said second epicyclic gear set.

BRIEF DESCRIPTION OF THE DRAWINGS

For a better understanding of the invention, and to show how embodiments of the same may be carried into effect, reference will now be made, by way of example, to the accompanying diagrammatic drawings, in which:

FIG. 7 is a table showing an example of how the drive system of FIG. 2 may operate under different conditions, with reference to successive units of time.

DESCRIPTION OF EXAMPLES

Figure 1:
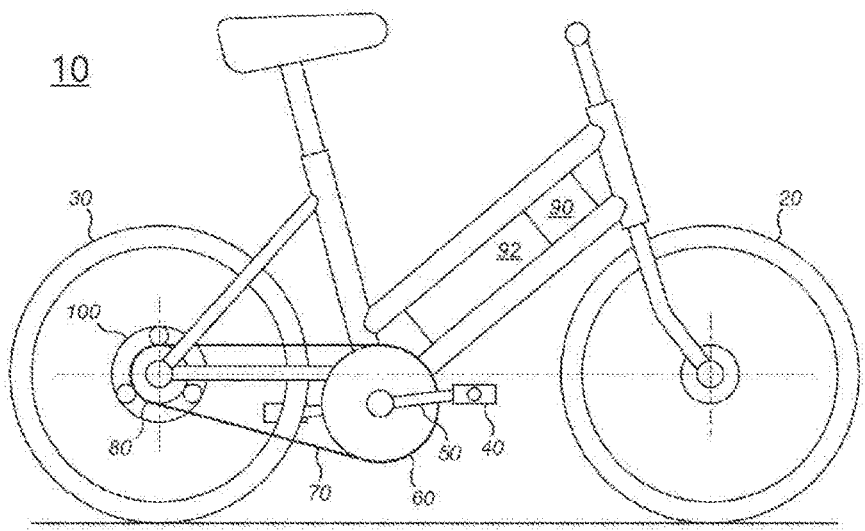
FIG. 1 is a side view of a pedelec.

In the figures, like references denote like or corresponding parts.

It is to be understood that the various features that are described in the following and/or illustrated in the drawings are preferred but not essential. Combinations of features described and/or illustrated are not considered to be the only possible combinations. Unless stated to the contrary, individual features may be omitted, varied or combined in different combinations, where practical, within the scope of the appended claims.

FIG. 1 shows a pedelec in the form of a bicycle 10. The bicycle 10 is similar to a conventional bicycle in having a steerable wheel 20 at the front and a driveable wheel 30 at the back. The bicycle 10 also has a conventional arrangement of pedals 40 on crank arms 50 that drive a front toothed cog 60 connected by a chain 70 to a rear sprocket 80, the rear sprocket being mounted co-axially with the rear wheel 30. However, the bicycle 10 differs from a conventional bicycle in that the rear sprocket 80 is not fixedly mounted to a hub 100 of the rear wheel 30 to drive that wheel directly. Instead, the rear sprocket 80 provides a rider's power input to a drive system that is disposed within the hub 100.

A control housing 90 and a battery housing 92 are fitted to the frame of the bicycle 10.

A drive system is mounted within the hub 100 and is described as follows, with reference to FIG. 2. For ease of explanation, the hub 100 is referred to in the following as an outer hub 100 and provides an output of the system. The outer hub 100 is typically connected to the outside of the rear wheel 30 by spokes, or by any other connection, to provide drive to the rear wheel 30.

As mentioned above, the sprocket 80 is not connected directly to the outer hub 100, as would be the case with a regular bicycle. Instead, it is connected to an inner hub 2 (not shown in section) that is mounted on bearings for rotation about a fixed axle 1, which is secured to the bicycle frame. The sprocket 80 incorporates a freewheel mechanism, as found on many regular bicycles. The outer hub 100 is of generally cylindrical shape and is mounted at a first end on the inner hub 2, via a one-way clutch K. An opposite end of the outer hub 100 is mounted on the axle 1 by way of bearings 101. The outer hub 100 and the inner hub 2 are rotatable about a common axis, which is the axis of the axle 1.

An electrical machine that is operable as a motor comprises a stator 5 that is fixedly mounted on the axle 1 and a rotor 6 that is mounted on a split shaft 7A, 7B (not shown in section) that is mounted on suitable bearings for rotation about the axle 1. A first epicyclic gear set EP-1 connects the shaft 7A to the outer hub 100. A second epicyclic gear set EP-2 connects the shaft 7B to the outer hub 100. The axle 1 is hollow and receives cables to connect a controller 91 (and a battery 93) to components of the drive system.

In a variation, a one-way clutch may be mounted between rotor 6 and split shaft 7B, to enable split shaft 7B to become de-coupled from rotor 6 should rotor 6 be forced to run clockwise if seen in the direction of arrow A.

The first epicyclic gear set EP-1 comprises a sun gear 11 that is mounted on the shaft 7A at one side of the motor 5,6, three planet gears 12 that are mounted on a planet carrier 13, and an annulus or ring gear 14 that is secured to the outer hub 100. The planet carrier 13 is connected to the axle 1 via a one-way clutch V. The epicyclic gear set EP-1 thus provides drive between the rotor 6 of the electrical machine and the outer hub 100.

The second epicyclic gear set EP-2 comprises a sun gear 21 that is mounted on the shaft 7B at the other side of the motor 5,6, three planet gears 22 that are mounted on a planet carrier 23, and an annulus gear 24 that is secured to the outer hub 100. The planet carrier 23 is connected to the inner hub 2, to rotate with it. The epicyclic gear set EP-2 thus provides drive between the rotor 6 of the electrical machine and the outer hub 100. It also provides drive between the sprocket 80 and the outer hub 100.

The second epicyclic gear set EP-2 translates physical effort from the pedals 40 into motion of the rear wheel 30, via the sprocket 80 and planet carrier 23. The one-way clutch K prevents the planet carrier 23 from rotating faster than the annulus 24 and outer hub 100.

Figure 2:
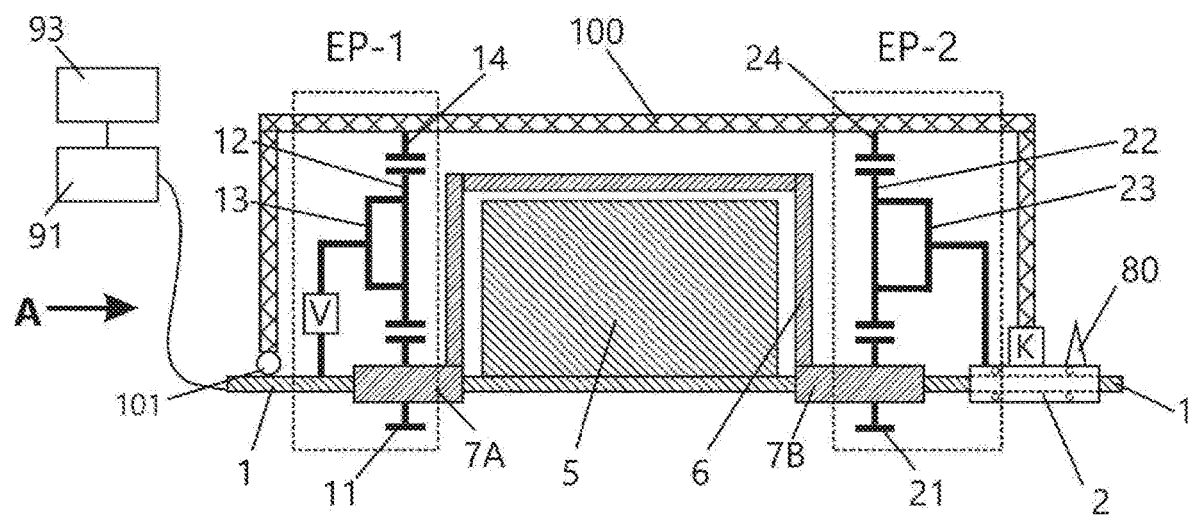
FIG. 2 is a mostly sectional view of a drive system for the pedelec.
Figure 3:
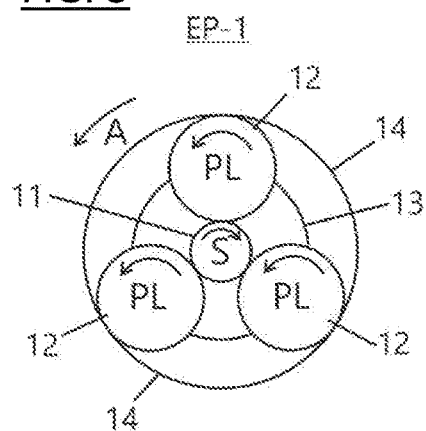
FIG. 3 illustrates the motion of gears of a first epicyclic gear set.

With reference to FIG. 3, motor drive from the rotor 6 is used to boost speed by driving the sun gear 11 clockwise (as seen from the left-hand side of FIG. 2 in the direction of arrow A). The planet carrier 13 would also tend to rotate clockwise, but it is fixed to the axle 1 via the clutch V, which allows the planet carrier 13 to rotate only in an anticlockwise direction. Thus, the planet gears 12 rotate anticlockwise, causing anticlockwise rotation of the annulus gear 14 and thus the outer hub 100, in the direction of ride.

Figure 4:
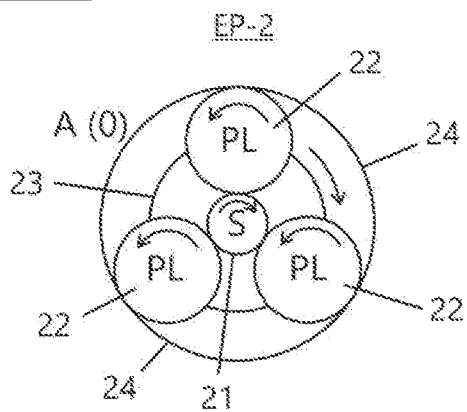
FIG. 4 illustrates the motion of gears of a second epicyclic gear set.

With reference to FIG. 4, when the outer hub 100 and therefore the annulus 24 are stationary, rotation of the planet carrier 23 causes anticlockwise rotation of the planets 22, thus tending to rotate the annulus 24 and outer hub 100 anticlockwise, in the direction of ride. Equally, if the sun 21 is driven clockwise by the rotor shaft 7B, it causes anticlockwise rotation of the planets 22 and thus the annulus 24 and outer hub 100.

Power input by a rider from the pedals 40 is transmitted to the planet carrier 23 via the sprocket 80 and thus to the outer hub 100 to drive the rear wheel 20. Electrical assistance from the rotor 6 is supplied via the sun 21. EP-2 thereby affords a continuously variable transmission (CVT). Examples of such CVTs are given in our WO publications mentioned above.

Upon setting off, an electrical boost is provided by EP-1. As the planet carrier 13 is locked, a direct drive is provided from the rotor 6 to the sun 11 and thereby through the gear train to the outer hub 100. Electrical boost is also available at other times when required such as, for example, climbing a hill. When pedalling stops and/or a brake of the bicycle 10 is applied, this is detected and the controller 91 ceases the supply of power to the motor 5,6.

FIG. 7 contains Table 1, which shows an example of how the drive system of FIG. 2 may operate under different conditions, with reference to successive units of time 1 to 7. A duplex crank speed sensor (e.g. a Hall sensor) is connected to controller 91. The transmission ratio of EP-1 is 1:5—that is, the angular speed m of the rotor 6 is 5 times the angular speed n of the outer hub 100. The typical transmission ratio of EP-2 is 1:8—that is, the angular speed m of the rotor 6 is 8 times the angular speed n of the outer hub 100.

The system has a buffer zone between $m/8 < n <= m/5$ and within this buffer zone, the motor 5,6 can boost, while the carrier 23 of EP-2 is either free-wheeling, or adding additional power to the system, until the annulus/hub member 100 speed overruns EP-1 carrier 13.

By adopting a torque sensor, to which the controller 91 responds, the motor can start from stand still and boost until the hub 100 overruns EP-1.

An advantage of the design of FIG. 2 is that the clutch V grounding the carrier EP-1, by connection to the fixed axle 1, is actually a crank-backward-movement preventer, which can eliminate the risk that the crank 50 is turned backwards by the motor 5,6. Another advantage is that hill climbing may be much better than previously proposed CVT drives. A further advantage is that torque addition to the hub 100 does not concentrate on one side. The illustrated configuration allows the bicycle 10 to be pushed in a walk-by-side mode, without blocking the hub 100. Whilst pushing, some motor assistance may be provided. For example, according to regulations in the EU, whilst pushing a pedelec, the person pushing the vehicle may use a walk-by-assistant button to activate the motor to provide him/her with additional torque up to a bike speed of 6 km/h.

As an option, the electrical machine 5,6 may be configured to operate selectively as a generator or a motor and the controller 91 alternately operates the electrical machine 5,6 as a generator for a first period and then as a motor for a second period, the controller 91 obtaining an indication of torque applied at the inner hub 2 as a function of generator output, and then applying power to the motor 5,6 as a function of the torque indicated. Such an arrangement is disclosed in our publication WO2017/021715.

Figure 5:
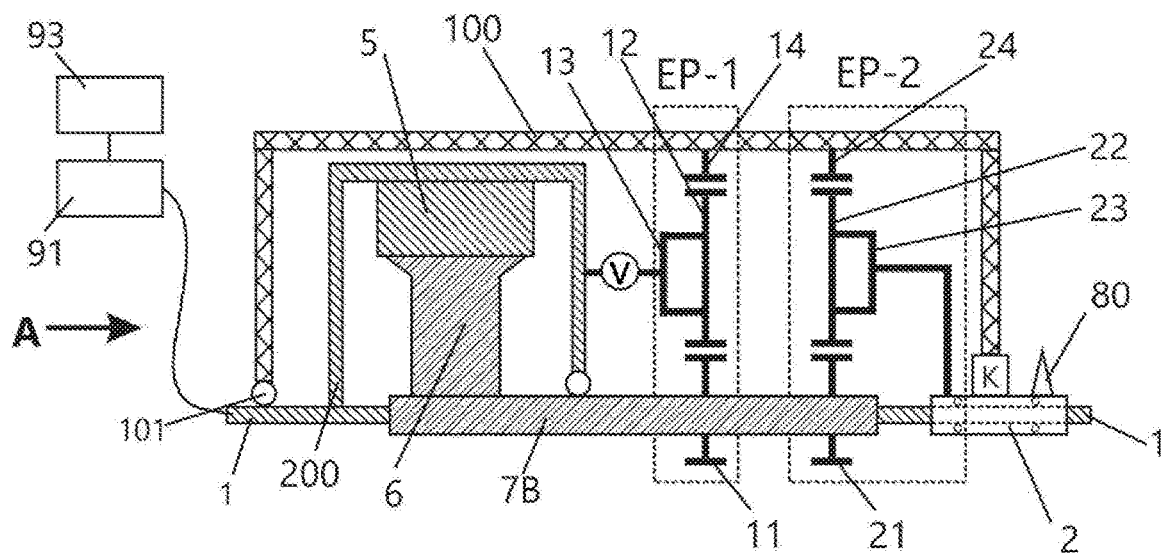
FIG. 5 is a mostly sectional view of an alternative drive system for the pedelec.

FIG. 5 illustrates a drive system that operates in a similar manner to that of FIG. 2, but has a different physical configuration.

In FIG. 5, stator 5 is mounted to a portal structure 200 that is fixed to the axle 1 and therefore remains stationary. Rotor 6 is disposed within the stator 5 and mounted to shaft 7B that, as before, is mounted on suitable bearings for rotation about axle 1. Both sun gears 11, 21 are mounted on the shaft 7B and therefore rotate with the rotor 6. In FIG. 5, the first planet carrier 13 is connected to the stationary portal structure 200, and therefore to 'ground', via one-way bearing or clutch V. A bearing is provided at the right-hand side (as seen) of portal structure 200, to engage with shaft 7B.

It will be appreciated that the drive system of FIG. 5 has components generally corresponding to those shown in FIG. 2 and it operates in a similar manner. As the two epicyclic gear sets EP-1 and EP-2 are located next to one another, they could share a common, extended sun gear in place of the two separate sun gears 11, 21. The configuration of FIG. 5 may be well suited to use as the hub of a rear, driven wheel of a cycle.

In the configuration of using the device as shown in FIG. 5 as a rear wheel hub drive unit, the rider may from time to time push his vehicle backwards, during which the sun gears 11 and 21 will be forced to turn anticlockwise (as observed in the direction A). Because the base ratios of the EP-1 and EP-2 may be different, one of the sun gears may have theoretically a different speed to the other one. Whereas, as they are coupled, to have different rotating speeds may become impossible, such that the hub will become blocked while the bike is being pushed backwards, and the wheel will skid on the road surface. To prevent this inconvenient and unnatural phenomenon from happening, the sun gears may remain separate and one of the sun gears may incorporate a one-way-bearing to decouple it in the anticlockwise direction, so that the bike can be pushed freely backwards.

Figure 6:
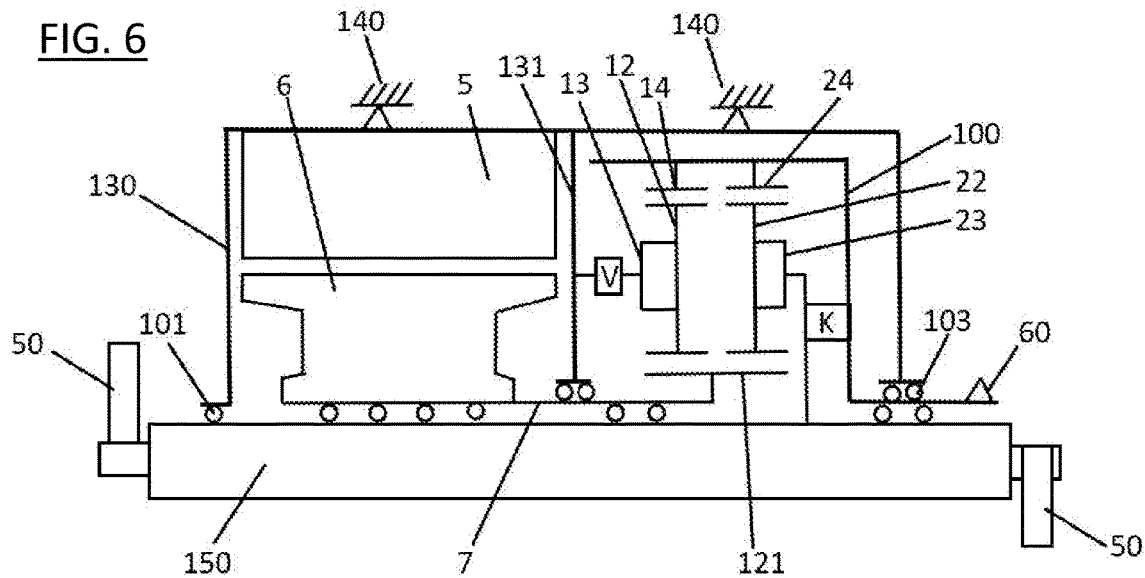
FIG. 6 is a mostly sectional view of another alternative drive system for the pedelec.

The drive system shown in FIG. 6 also operates in a similar manner to the systems of FIGS. 2 and 5. However, the FIG. 6 variant is configured for use as a central or mid-drive location, around a spindle connecting two pedal cranks 50.

Drive from the pedals 40 is transmitted to EP-2 via its planet carrier 23 which, in this case, is secured to shaft 150 that is driven in rotation with the pedal cranks 50. Shaft 150 therefore provides the input.

The motor 5, 6 has a stator 5 mounted to a housing 130 that is secured to a frame of the cycle at 140. The housing 130 has bearings 101 at one end, which engage with the shaft 150, and bearings 103 that engage at the other end with an output member 100 which, in turn, is mounted on bearings that engage the shaft 150 and provides the output. The output member 100 and the shaft 150 are rotatable about a common axis, which is the axis of rotation of the pedal cranks 50. The housing 130 has an intermediate wall 131 to form an enclosure around the motor 5, 6.

The rotor 6 is mounted on output shaft 7 which, in turn, is mounted on shaft 150 via bearings. A common sun gear 121 that is common to EP-1 and EP-2 is mounted on shaft 7. First planet carrier 13 is connected to the intermediate wall 131 of the housing 130 via one-way clutch or bearing V, which grounds the clutch or bearing V in one direction. Both annulus gears 14, 24 are connected to the common output member 100. One-way clutch K is effective between the second planet carrier 23 and common output member 100.

In use, input from the pedal cranks 50 is applied to EP-2 via its planet carrier 23. Motor drive is provided to both EP-1 and EP-2 via common sun gear 121. Drive from output member 100 is transmitted to a driven wheel via a chain wheel 60 that connects to a drive sprocket on the driven wheel, typically via a freewheel mechanism.

Other than the changes in configuration, the drive system of FIG. 6 operates in a similar manner to that of FIGS. 2 and 5. However, it is more suited to location as a central or mid-drive, adjacent to the pedal cranks 50 and their connecting spindle.

Features of particular interest of embodiments of the invention include the following. A double-headed sun gear (or two sun gears in parallel), meaning that one motor is driving at the same time two different gearsets. A combination of two different transmission ratios, which creates a slot for direct drive at low speed, and a transition to CVT drive at a higher speed with higher human input. A very simple transmission system that provides direct boost in low gears (at launch or low speed) and hybrid boost in its CVT function while it changes gear from low to high. A gearing system that switches back to its lowest gear when the vehicle stops, for example at traffic lights (by comparison, re-launch of a derailleur bike at traffic lights could be hard and require high effort if the gear is set too high before stopping.)

Thus, the embodiments of the invention as illustrated and described above may provide pedelecs and drive systems for them, in which an electrical power boost may be provided in a predictable and repeatable manner, in order to afford a ride that feels as natural as possible to a rider. The embodiments may be particularly effective in the use of a 3-branch power combining epicyclic transmission (two inputs and one output) in a CVT transmission.

The above description is given with reference to a pedelec, in which electrical assistance is provided only when the cyclist is pedalling. At the present time, pedelecs are commercially attractive since, in many countries, as mentioned above, a license is not needed to ride a pedelec. However, different countries have different licensing regimes and, in some countries, an electrically-assisted pedal cycle may be ridden without a license, even when electrical assistance is provided when the cyclist is not pedalling. Thus, there is an option to modify operation of the above described embodiments to include electrical assistance when the cyclist is not pedalling.

Such an option needs no modification of the mechanical arrangement of the above-described drive systems. It can be achieved by providing the user with a throttle control—for example, a twist-grip control incorporated in the handlebar of the cycle. Referring to FIG. 2 by way of example, the output of the throttle control is connected to the controller 91. In normal pedelec mode, the controller 91 runs an algorithm that calculates in real time a PWM value as a command to control the motor 5,6. This PWM value determines how much current is applied to the motor and at what speed the motor runs. If the rider wishes to increase speed, the rider uses the throttle control to simply increase the PWM value at the rider's will. Typically, the throttle control does not bypass the controller 91 algorithm completely but can deliberately and effectively increase the motor power, i.e. to allow the motor to provide more power ad hoc than that which the algorithm may have calculated, based on predetermined parameters, to command the motor to provide. If the PWM value set by the throttle control is higher than the actual PWM value set by the algorithm, the higher value will be used to control the motor current/speed. Another possible throttle algorithm is for the throttle to provide a PWM offset value that is added on top of the PWM value calculated by the controller 91 algorithm for normal pedelec operation.

Thus, throttle control may be effectively superimposed upon the previously described CVT transmission.

In this specification, the verb "comprise" has its normal dictionary meaning, to denote non-exclusive inclusion. That is, use of the word "comprise" (or any of its derivatives) to include one feature or more, does not exclude the possibility of also including further features. The word "preferable" (or any of its derivatives) indicates one feature or more that is preferred but not essential.

Within the scope of the appended claims, all or any of the features disclosed in this specification (including any accompanying claims, abstract and drawings), and/or all or any of the steps of any method or process so disclosed, may be combined in any combination, except combinations where at least some of such features and/or steps are mutually exclusive.

Within the scope of the appended claims, each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed, within the scope of the appended claims.

The invention claimed is:

1. A drive system for an electrically-assisted pedal cycle, the drive system comprising:
   an input that receives drive from a pedal of the cycle and rotates about an axis;
   an output that rotates about said axis and provides drive to a driven wheel of the cycle;
   an electrical machine that provides motor drive to said output; and a drive train that receives drive from the electrical machine and the pedal and transmits drive to said output;

wherein:

the drive train comprises a first epicyclic gear set and a second epicyclic gear set;

the first epicyclic gear set and second epicyclic gear set each comprise a sun gear, a planet carrier, a plurality of planet gears and an annulus gear, the planet gears being mounted on the planet carrier and meshing with both the sun gear and the annulus gear, and the annulus gear being connected to said output to rotate, in use, with said output;

both of the sun gears are connected to be driven by the electrical machine:

the first epicyclic gear set transmits drive from its respective sun gear to its respective annulus gear with its respective planet carrier in a fixed position; and the second epicyclic gear set transmits drive from a pedal to its respective annulus gear via its respective planet carrier.

2. The drive system of claim 1, further comprising a one-way clutch between the planet carrier and annulus gear of the second epicyclic gear set that prevents the planet carrier from rotating faster than the annulus gear of the second epicyclic gear set.

3. The drive system of claim 1, further comprising a free-wheel mechanism that is operative between the pedal and driven wheel of the cycle.

4. The drive system of claim 1, wherein the electrical machine is configured to operate selectively as a generator or a motor and the system further comprises a controller that alternately operates the electrical machine as a generator for a first period and then as a motor for a second period, wherein the controller obtains an indication of torque applied at an inner hub as a function of generator output, and then applies power to the electrical machine when operating as a motor as a function of the torque indicated.

5. The drive system of claim 1, located at a mid-position of the cycle, wherein said axis is an axis of rotation of the pedal.

6. The drive system of claim 1, located at a hub of the driven wheel of the cycle, wherein said axis is an axis of an axle about which the driven wheel rotates.

7. The drive system of claim 6, wherein said driven wheel is a rear wheel of the cycle.

8. The drive system of claim 1, wherein the sun gear of the first epicyclic gear set and the sun gear of the second epicyclic gear set are a common sun gear.

9. The drive system of claim 1, wherein the sun gear of the first epicyclic gear set and the sun gear of the second epicyclic gear set are separate gears, one of which is connected to receive said motor drive via a one-way-bearing that facilitates pushing of the cycle backwards.

10. The drive system of claim 1, wherein the first epicyclic gear set and the second epicyclic gear set have different transmission ratios.

11. The drive system of claim 1, wherein the first epicyclic gear set and second epicyclic gear set are on opposite sides of the electrical machine.

12. The drive system of claim 1, wherein the first epicyclic gear set and second epicyclic gear set are on the same side of the electrical machine.

13. An electrically-assisted pedal cycle having the drive system of claim 1.

14. The electrically-assisted pedal cycle of claim 13, being a pedelec in which electrical assistance from the drive system is provided only while pedalling.

15. The electrically-assisted pedal cycle of claim 13, in which electrical assistance from the drive system is available both when pedalling and not pedalling.

16. The electrically-assisted pedal cycle of claim 15, having a throttle that applies or superimposes a desired amount of electrical assistance from the drive system.

17. A method comprising operating the electrically-assisted pedal cycle of claim 13 by providing motor drive to the driven wheel of the cycle by said electrical machine and via said first epicyclic gear set, and providing pedal drive to the driven wheel of the cycle via said second epicyclic gear set.

* * * * *